United States Patent [19]

Beere

[11] Patent Number: 5,110,146
[45] Date of Patent: May 5, 1992

[54] COLLET CLAMPING AND RELEASING YOKE APPARATUS

[75] Inventor: Richard F. Beere, Waterford, Wis.

[73] Assignee: Beere Tool Company, Inc., Racine, Wis.

[21] Appl. No.: 543,556

[22] Filed: Jun. 26, 1990

[51] Int. Cl.⁵ .............................................. B23B 31/20
[52] U.S. Cl. .................................... 279/43; 279/50; 279/4.04; 279/156; 269/87.3; 269/287
[58] Field of Search ............... 279/43, 46 R, 57, 74, 279/4, 48, 50, 15; 409/232, 233; 29/263; 248/316.2; 269/87.3, 34, 287, 288

[56] References Cited

U.S. PATENT DOCUMENTS

| 809,296 | 1/1906 | Gordon | |
|---|---|---|---|
| 2,393,458 | 1/1946 | Cook | 279/4 |
| 2,466,651 | 4/1949 | Zager | 279/50 |
| 2,479,973 | 8/1949 | Scott et al. | 279/65 |
| 2,562,455 | 7/1951 | Gridley | 279/1 ME |
| 3,087,736 | 4/1963 | Lukas | 279/4 |
| 3,306,604 | 2/1967 | Christensen | 269/240 |
| 3,632,122 | 1/1972 | Sessody | 279/4 |
| 3,791,661 | 2/1974 | Giles | 279/43 |
| 4,614,469 | 9/1986 | Beere et al. | |

Primary Examiner—Larry I. Schwartz
Assistant Examiner—Robert Schultz
Attorney, Agent, or Firm—Arthur J. Hansmann

[57] ABSTRACT

A collet clamp and releasing yoke apparatus having a support block and a cylindrical sleeve for receiving a collet. The collet is axially fixed, and the sleeve moves for contracting the collet to clamp a workpiece therein, and a yoke is employed for the clamping and releasing movement of the sleeve. A plurality of these assemblies can be positioned within the block so that a plurality of workpieces can be retained and worked upon.

16 Claims, 2 Drawing Sheets

COLLET CLAMPING AND RELEASING YOKE APPARATUS

This invention relates to a collet clamping and releasing yoke apparatus which may be activated either manually or under fluid power.

BACKGROUND OF THE INVENTION

The prior art is already aware of collet clamping and releasing devices such as those shown in U.S. Pat. Nos. 2,393,458 and 3,087,736 and 3,791,661. Also, devices for actuating a clamping chuck or vise jaw are shown in U.S. Pat. Nos. 809,296 and 2,479,973 and 3,306,604.

Still further, the prior art is already aware of devices where a plurality of collets or chucks are operative within a single mounting block, such as shown in U.S. Pat. Nos. 3,632,122 and 4,614,469.

The present invention improves upon the prior art in that it utilizes a yoke which snugly engages an axially movable sleeve surrounding the collet, and thereby providing for quick and precise retention of the collet which is holding the workpiece itself. In this arrangement, the yoke engages the sleeve on three sides of the sleeve to thereby retain the sleeve in an aligned position and against a rotation, even though the sleeve itself may have slight clearance relative to the block in which it is mounted. Therefore, the collet itself is locked evenly in place, even though there may be slight clearance with respect to the sleeve. Further, with the yoke preventing sleeve rotation, the collet and sleeve are readily non-rotatably related so therefore the collet itself cannot rotate. For precision workmanship, it is critical that the collet does not have any radial play or movement of any sort, and the yoke employed in this invention assures the desired precision.

Still further, the present invention is an improvement in that the collet locking actuator is enclosed entirely within the support block itself, so there is no interference with the tooling which is applied to the workpiece, and the entire collet supporting apparatus is therefore arranged with no protruding parts which could interfere with the use of the apparatus. Also, the actuator is operative, at least in one embodiment herein, by means of standard wrenches, either manual or powered wrenches. In that embodiment, the apparatus does not depend upon return springs or the like for release of the collet, but instead the collet is positively released manually.

This invention accomplishes the aforementioned and does so by means of a collet retainer which is connected with the mounting block itself so that the collet and its retainer are always available and in position, and thus when the collet is in the released position it is still supported on the mounting block and will not have to be readjusted nor will it become disassembled and possibly lost.

The arrangement herein also permits the workpieces to be loaded from either axial end of the collet, and the collets can also be closely based relative to each other so that there is only a minimum of tool travel for working on a plurality of the collets supported in one common work block. This also provides for a saving of space, as well as efficiency in the tooling action, and thus idle time is held to a minimum. Also, a single fastener, such as a nut, is employed in the connected position relative to the support block, and that single nut is always available on the support block for receiving and fastening to a selected variety of collets, and thereby promoting the changing of collets for desired sizes and the like.

Still further, workpiece stops can be readily mounted on the support blocks to be adjustably positioned in alignment with the workpiece for stopping the workpiece in the desired position for clamping in the collet. The stops employed herein also do not interfere with the movement or dispensing of chips or other debris which can actually move through the collet itself and away from the entire apparatus.

In all of these instances, the present invention can utilize the standard type of collet, and no specially designed collet is required, and the collet fastener, or nut, is employed for the customary holding of the standard collet, but, in the present instance, as mentioned above, the fastener or nut in this invention is retained with the support block and cannot be removed from the support block, except for an intentional disassembly of the nut relative to the block, and that entails more than simply unthreading the nut relative to the block such as might be done in U.S. Pat. No. 2,393,458, for instance.

Accordingly, the present invention provides for a collet actuator which may be either manual or power actuated, and it may be either a single mounted collet or a plurality of collets in a single support block, and, in any instance mentioned, the workpiece is held to a high standard of precision by virtue of the yoke surrounding the movable sleeve acting upon the collet itself.

DETAILED DESCRIPTION OF THE PREFERRED EMBODIMENTS

Figure 1:
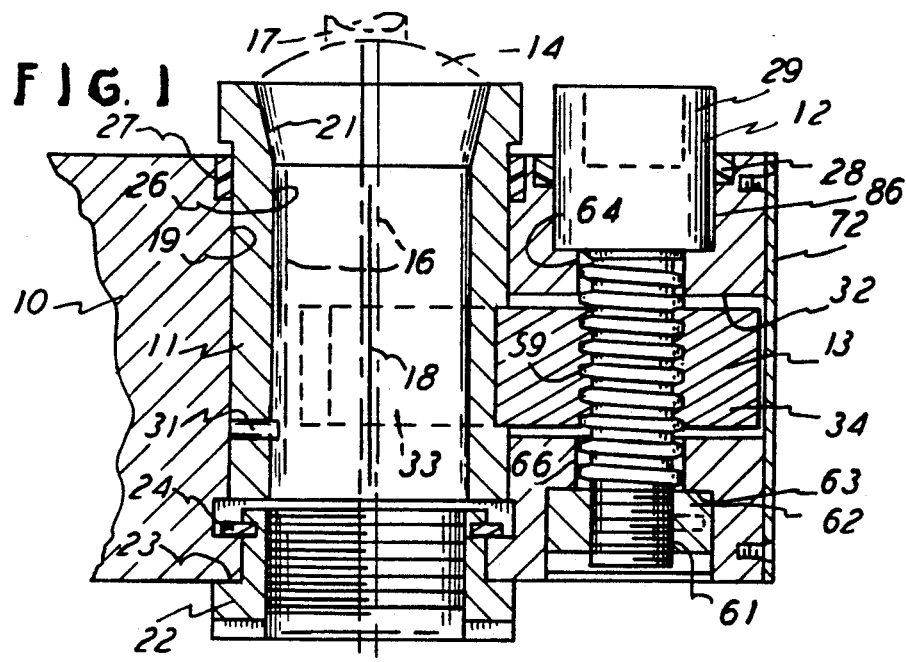
FIG. 1 is a sectional view of an embodiment of the apparatus of this invention.
Figure 7:
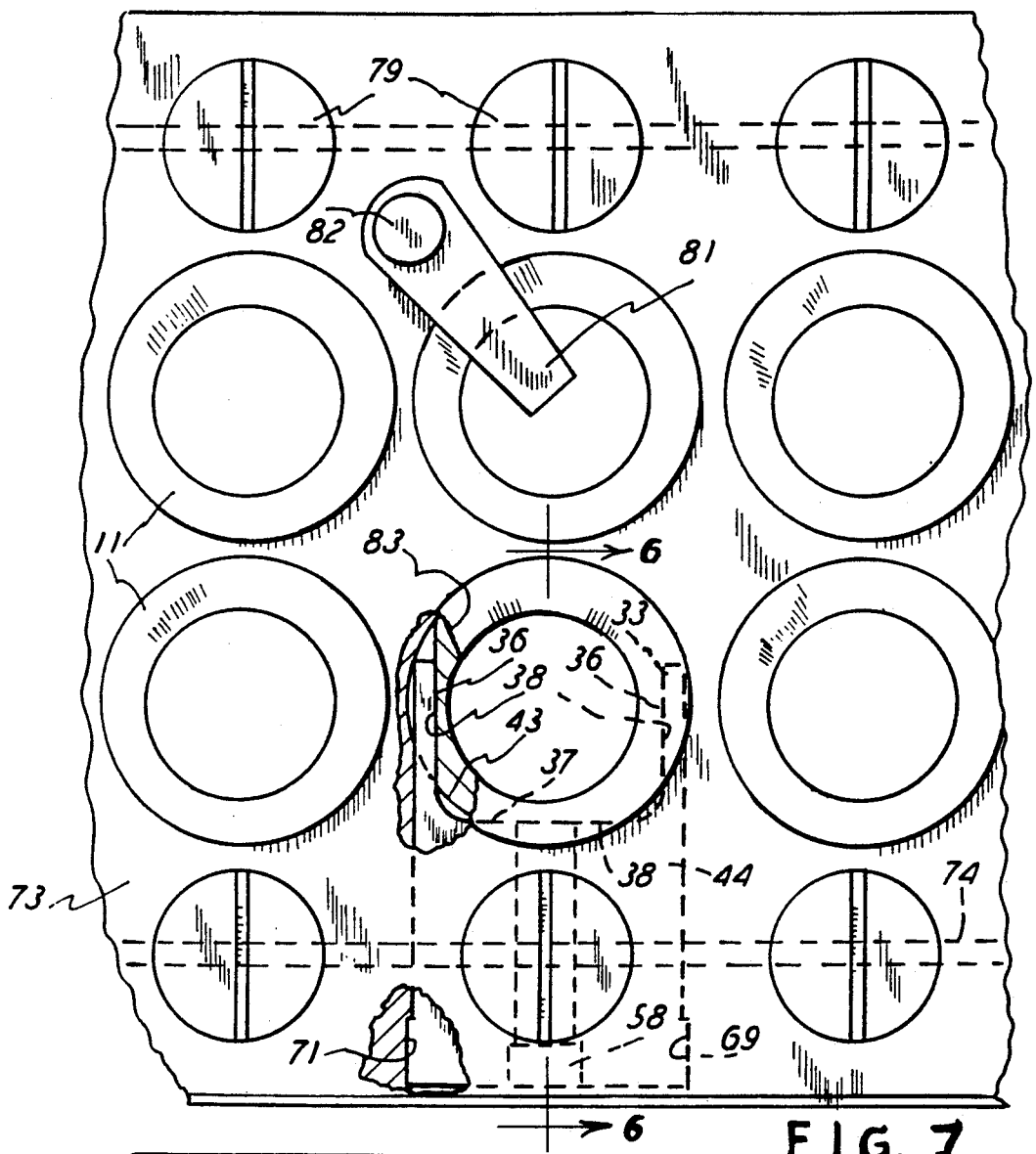
FIG. 7 is a plan view of a support block with a multiplicity of the collet assemblies such as shown in FIGS. 1 and 6, but specifically being that shown in FIG. 6.
Figure 6:
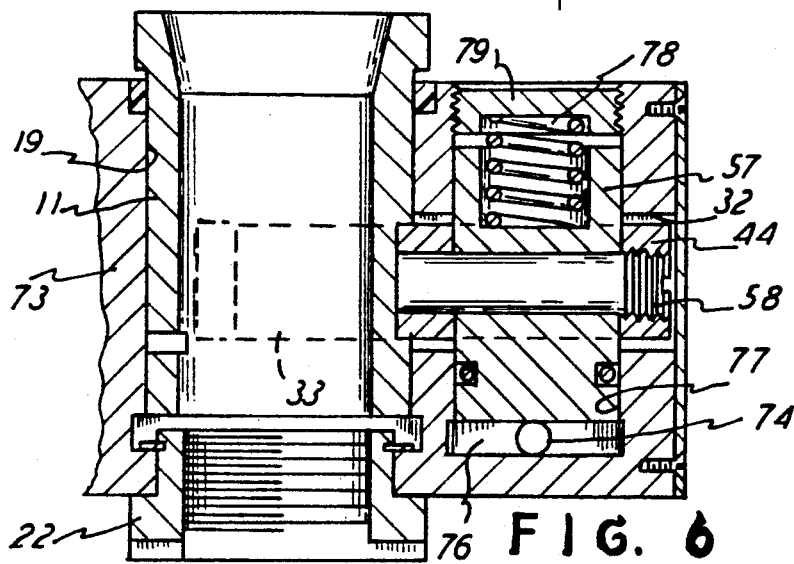
FIG. 6 is a sectional view of another embodiment of this invention, and it is similar to the section view of FIG. 1, and it is taken on the line 6—6 of FIG. 7.

The drawings show two embodiments of this invention, namely the manual or screw-actuated embodiment shown in FIG. 1, and the hydraulic embodiment shown in FIG. 6, and FIG. 7 actually relates to both embodiments in that it shows the arrangement with a plurality of the units, of either embodiment, assembled into one common support block.

FIG. 1 shows a support block 10 which generally receives a sleeve 11, an actuator screw 12, and a yoke 13 which is of this invention. Also, there is a collet 14, for purposes of clarity shown in dot/dash lines and which is of the standard type of collet, namely, the 5-C collet which has its elongated cylindrical shape and which has its usual elongated slots 16. Of course it will be further understood that a workpiece, such as the piece shown in dot/dash lines 17 can be disposed and retained axially within the collet 14 when the collet is suitably radially compressed, such as by the axially movable sleeve 11. It will be understood that there is a cylindrical axis 18 on which the sleeve 11 and collet 14 are located, and of course the sleeve 11 is disclosed in a cylindrical hole 19 in the support block 10. The sleeve 11 is snugly disposed within the support block 10, but it is axially slidably movable within the hole 19, for creating the clamping action on the collet 14 through the frusto-conical sleeve portion 21 which bears against the corresponding outer surface of the collet 14.

Thus, the collet 14 has its usual threaded lower end, as viewed in FIG. 1, and that threaded end is received in a nut 22 which is axially fixedly retained on the support block 10 by means of the shoulder 23 and the snap ring 24, for instance. In that manner, the collet 14 is also axially fixed relative to the support block 10. As mentioned, it is of course the axial displacement of the sleeve 11 relative to both the support block 10 and the axially fixed collet 14 that will cause the collet 14 to clamp inwardly on the workpiece 17, and there is also the corresponding release of the workpiece 17 in the reverse movement of the sleeve 11.

Of course the nut 22 is free to rotate relative to the collet 14 and the support block 10, and thus the collet 14 threads onto and off the nut 22 upon rotation of the nut 22.

With the arrangement described, it will be seen and understood that the central portion of the sleeve 11, as defined by the cylindrical wall 26, and the similar open and central portion of the nut 22, are arranged so that the chips and debris formed by working on the workpiece 17 can simply fall downwardly through the sleeve 11 and out of the way, at least when the collet 14 and workpiece 17 are released. It will also be noted that there is a cylindrical seal 27 surrounding the upper end of the sleeve 11, and there is also a cylindrical sleeve 28 surrounding the head 29 of the screw 12, and these seals 27 and 28 preclude debris entering the moving parts of this apparatus.

A pin 31 extends between the sleeve 11 and into one of the usual slots 16 of the collet 14 so that the sleeve 11 and collet 14 are held together in a non-rotatable relationship, though of course the sleeve 11 can slide along its axis while the collet 14 is being retained axially, as described. In the description hereinafter, it will be further seen that the sleeve 11 is itself held against rotation, so that the entire assembly of the collet 14 and sleeve 11 is held against any rotation and thus the workpiece 17 is in a rigid position for working thereupon.

To accomplish the axial movement of the sleeve 11, and also the non-rotation of the sleeve 11, the yoke member 13 is disposed within the block 10 in an oversized opening designated 32 as seen in the section view of FIG. 1. The yoke 13 can therefore move within the upper and lower walls of the support block opening 32, but it cannot move in any other relationship relative to the support block 10, as more clearly described hereinafter.

Figure 4:
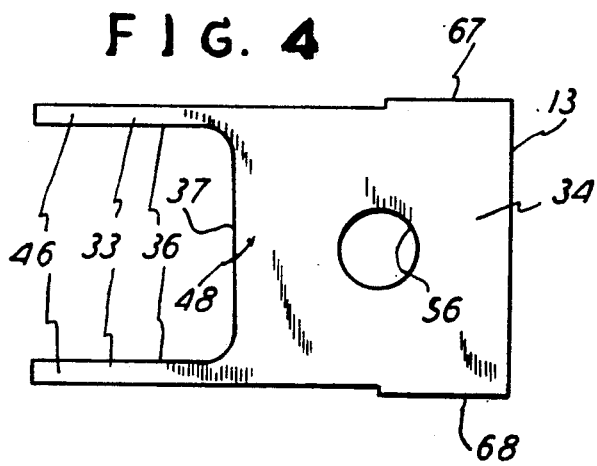
FIGS. 4 and 5 are top and side views, respectively, of the yoke shown in FIG. 1.
Figure 2:
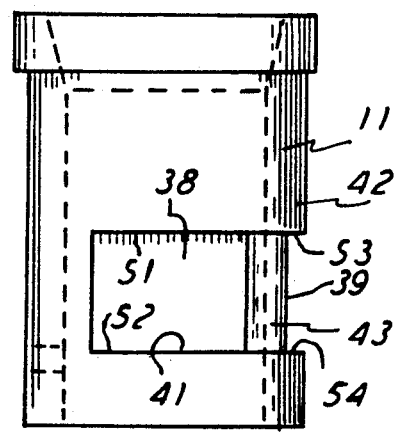
FIGS. 2 and 3 are elevational views of the sleeve shown in FIG. 1.
Figure 3:
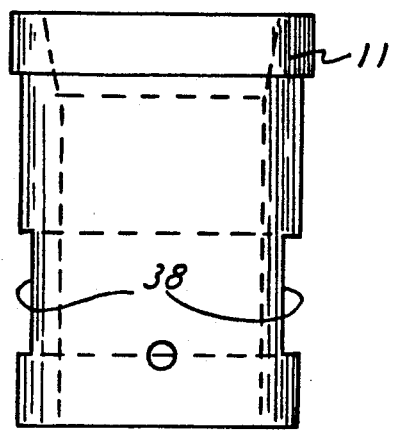

The yoke 13 has two extending fingers 33 and it has a body portion 34 which is actually disposed within the block opening 32. FIG. 4 more clearly shows the yoke 13 where the two fingers 33 have planar surfaces 36 and 37, and these surfaces respectively engage planar surfaces 38 and 39 which are walls defining a groove 41 in the sleeve 11, as best shown in FIGS. 2 and 3.

That is, the outer circumference 42 of the sleeve 11 has the groove or grooves 41 formed in and around substantially three sides of the sleeve 11, and each of those grooves 41 is defined by a straight or planar wall presented by the two diametrically opposite walls 38 and the one intervening wall 39, as shown. There is a slight arcuate intervening portion 43, as shown in FIG. 2 and also as shown in FIG. 7, and that portion 43 is between each of the side walls 38 and the intervening planar walls 39, as mentioned. It will be further understood that the yoke in the two embodiments described herein is identical with respect to the fingers 33 and its planar walls 36 and 37, as being described herein, though the body portion of the yoke, such as the portion 34, is different between the two embodiments.

Accordingly, the drawings, including FIG. 7, show that the yoke 13, and the modified yoke 44 of FIG. 7, are utilized to present their finger planar surfaces 36 and 37 in extremely close or snug overlying relationship with the respective sleeve walls 38 and 39 to thereby retain the sleeve 11 in the non-rotatable position mentioned. In both embodiments, the sleeve 11 is the same, and also the relationship and arrangement with the collet 14, workpiece 17, nut 22, and the pin 31, are identical between the two embodiments. The support block 10 and the yokes 13 and 44 are somewhat different.

Figure 5:
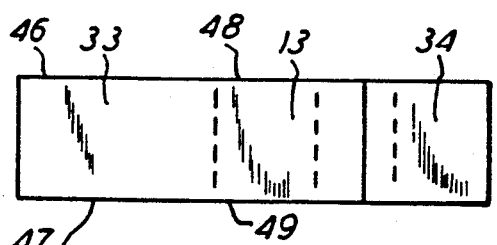

The yokes 13 and 44 also control and determine the axial positioning of the sleeve 11, and thus, in both embodiments, the respective yokes 13 and 44 have upper and lower surfaces 46 and 47, on the fingers 33 and as viewed in FIGS. 1, 5, and 6, and the two yokes also have an upper surface 48 and a lower surface 49 adjacent the planar surface 37. Correspondingly, the sleeve 11 has an upper surface 51 and a lower surface 52 and an upper surface 53 and a lower surface 54, all respectively corresponding to the surfaces 46, 47, 48, and 49. With that arrangement, movement of the yokes 13 and 44, in the up and down direction as viewed in FIGS. 1 and 6, will cause corresponding axial movement of the sleeve 11, and thus the clamping and releasing of the collet 14.

To effect the up and down movement of the respective collets 13 and 44, the FIG. 1 embodiment utilizes the screw 12 which is threadedly engaged in a threaded opening 56 in the collet 13, and the FIG. 6 embodiment employs a hydraulic piston 57 which is engaged with the yoke 44 by means of a pin 58 extending through both the yoke 44 and the piston 57, as shown in FIG. 6.

The screw 12 has its intermediate length 59 threaded into the yoke body 34, and the screw lower end 61 is contained axially by means of a threaded collar 62 which is restrained from at least upward movement in the support block 10, as shown, since the collar abuts against the block surface 63. Accordingly, rotation of the screw 12 will not axially displace the screw 12 but it will move the yoke 13 up and down, according to the direction of rotation of the screw 12, and as desired.

Further, the block 10 has a cylindrical passageway 64 and a cylindrical passageway 66, each being located at the opposite ends of the screw 12 and being in very snug contact with the threads of the screw 12 to thereby retain the screw 12 in a snug and non-tiltable relationship with the block 10 and permitting only the turning movement of the screw 12. In that arrangement, the screw 12 secures the yoke 13 in its precise position and precludes any tipping of the yoke 13 relative to the screw 12 and body 10 and sleeve 11. That is, the screw 12 is mostly piloted in openings 64 and 66 which are of the size of the addendums of the acme type screw 12 which is shown.

Finally, and again with regard to both embodiments, the respective yokes 13 and 44 are snugly disposed within the support block 10 and are piloted thereon by means of finished surfaces 67 and 68 on opposite sides of the respective yokes, and those surfaces 67 and 68 are in continuous sliding contact with two matching and respective surfaces 69 and 71 in the respective support blocks. With that arrangement, the yokes 13 and 44 are restrained from all movement relative to the respective support blocks, except for the precise up and down sliding movement described. That is, the yokes 13 and 44 cannot move tiltably nor rotationally relative to the respective support blocks, and thus the precise holding and positioning of the sleeve 11 is achieved.

To retain the block opening 32, and the like opening in FIG. 6, free of debris and the like, a cover plate 72 extends over the side of the respective support block which is block 10 in FIG. 1 and is designated as block 73 in FIG. 7.

In the hydraulic embodiment in FIGS. 6 and 7, the support block 73 has a hydraulic passageway 74 which is in flow communication with the support block chamber 76 and wherein there is a cylindrical wall 77 for slidably receiving the piston 57. Accordingly, with pressure in the chamber 76, the piston 57 will be forced upwardly and will thereby move the yoke 44 upwardly and accordingly move the sleeve 11 upwardly to cause the collet 14 to clamp on the workpiece 17.

To reverse the action, that is to release the collet, a compression spring 78 is disposed between the piston 57 and a nut 79 on the block 73 to thereby urge the piston 57 downwardly, and cause the yoke 44 to move downwardly and likewise move the sleeve 11 downwardly.

As shown in FIG. 7, a single support block, such as the shown block 73, and it could also be the block 10, is utilized for supporting a plurality of the units shown in FIGS. 1 and 6, and thus a plurality of workpieces 17 can be readily positioned adjacent each other and the unshown tooling can be then applied to the workpiece 17 in an efficient and accurate manner. Also, a workpiece stop 81 is adjustably mounted on the block 73 by means of the mounting screw 82. Thus the stop 81 can be disposed on the axis of the sleeve 11 and the collet 14 for positioning the workpiece 17 along the longitudinal axis. Also, the stop 81 can be swung out of the way when it is not to be used, and it will be understood that there can be a stop 81 for each of the units arranged in each of the respective blocks 10 and 73. Of course with the hydraulic embodiment, all of the workpieces 17 can be simultaneously clamped and released in their respective units, and this is by means of respectively applying and releasing fluid pressure relative to the pistons 57.

Accordingly, such as shown in FIG. 7, there is the broken-away portion designated 83 of the block 73, and that shows the yoke finger planar portion 36 in flat and extended contact with the matching planar portion 38 on the sleeve 11. There is also shown the yoke planar portion 37 which is contact with the corresponding sleeve planar portion 39, and there is shown the yoke planar portion 36 in full and matching contact with the sleeve planar portion 38. As such, there are the three locations around the circumference of the sleeve 11 where the respective yokes 13 and 44 engages the sleeve for both the precise axial movement of the sleeve 11 and for restraining all rotational motion of the sleeve 11.

In both embodiments, there are the respective actuators of the screw 12 and the piston 57, and they are each in rigid type connection with the respective yokes 13 and 44, and the respective yokes are also in rigid connection with the respective support blocks 10 and 73, except only for the sliding action of the yokes up and down in the blocks, as described. In that regard, the yokes surfaces 67 and 68 and the blocks surfaces 69 and 71 are finished surfaces for the snug and matched fitting described herein.

Therefore, the screw 12 is in snug bearing contact with the block 10 at 64 and 66, and also at the cylindrical opening 86. As mentioned, there is snug bearing contact for the yoke at 69 and 71, and, in all these instances, that is defined as being provided by a clearance of 0.001 inches. Also, the clearance between the yoke surfaces 46–57, and 48–49, compared to sleeve groove surfaces 51–52, 53–54 is only 0.0005 inches. Accordingly, it has been discovered that those relationships all produce the improved accuracy of clamping a workpiece, and it permits the repeat of the precise clamped position because there is no sleeve tilt, so precise repeated set-up positioning is possible.

What is claimed is:

1. A collet having a clamping and releasing yoke apparatus comprising a support block having a cylindrical hole therein, a hollow cylindrical sleeve disposed aligned with and snugly in said hole and being slidable therein along the cylindrical axis of said sleeve, a workpiece clamping collet disposed snugly in said sleeve and being of the type for radial inward clamping movement and being affixed to said support block for preventing movement of said collet relative to said support block along said cylindrical axis, said sleeve and said collet having matching surfaces in sliding contact for effecting radially inwardly clamping movement of said collet onto a workpiece disposed in said collet and upon axial sliding of said sleeve in said hole, a yoke slidably mounted on said support block for movement parallel to said cylindrical axis and including two spaced-apart and rigidly extending fingers having planar surfaces faces toward each other and extending along the lengths of said fingers which are disposed on and respectively engaged with diametrically opposite sides of said sleeve, said sleeve having grooves therein on said diametrically opposite sides and with said grooves being defined by planar surfaces disposed parallel to said planar surfaces of said fingers and at the base of said grooves and with said planar surfaces of said fingers being in snug contact with the base of said grooves which are snugly receiving said fingers for non-rotatably securing said sleeve, and an actuator operatively connected to said yoke for displacing said fingers in the two axial directions along said cylindrical axis for sliding said sleeve along said cylindrical axis to thereby actuate said collet for alternate clamping and releasing of a workpiece.

2. The collet clamping and releasing yoke apparatus as claimed in claim 1, wherein said yoke includes a portion disposed in a location offset from said cylindrical axis, and said actuator includes a force-applicator disposed in said offset location and arranged to apply the clamping and releasing forces on said portion and parallel to said cylindrical axis.

3. The collet clamping and releasing yoke apparatus as claimed in claim 2, wherein said force-applicator is a fluid-actuated piston engaged with said yoke portion, and said support block having a fluid passageway extending to said piston for actuating said piston.

4. The collet clamping and releasing yoke apparatus as claimed in claim 2, wherein said force-applicator is a screw threadedly engaged with said yoke portion and being axially fixed relative to said support block and being rotatable for threadedly applying the clamping and releasing forces on said portion.

5. The collet clamping and releasing yoke apparatus as claimed in claim 1, including a fastener with a hollow interior for affixing said collet to said support block while allowing a workpiece to extend through said collet and said fastener.

6. The collet clamping and releasing yoke apparatus as claimed in claim 5, including a workpiece stop adjustably mounted on said support block and being extendable to intersect said longitudinal axis for establishing the position of said workpiece in said collet.

7. The collet clamping and releasing yoke apparatus as claimed in claim 1, wherein said yoke and said support block include mutually snugly matching sliding surfaces remote from said sleeve and extending planar parallel to said cylindrical axis for closely guiding the sliding movement of said yoke on said support block in the directions parallel to said cylindrical axis.

8. The collet clamping and releasing yoke apparatus as claimed in claim 7, wherein said actuator includes a screw threadedly engaged with said yoke portion for the sliding movement of said yoke and being axially fixed relative to said support block and being rotatable for threadedly effecting the sliding movement of said yoke.

9. The collet clamping and releasing yoke apparatus as claimed in claim 7, wherein said actuator includes a fluid-actuated piston engaged with said yoke portion for the sliding movement of said yoke, and said support block having a fluid passageway extending to said piston for actuating said piston.

10. The collet clamping and releasing yoke apparatus as claimed in claim 1, wherein said yoke and said support block include mutually snugly sliding surfaces remote from said sleeve for non-rotatably securing said sleeve in said support block.

11. The collet clamping and releasing yoke apparatus as claimed in claim 1, including a restrainer extending between said sleeves and said collet for non-rotatably securing said sleeve and said collet together.

12. The collet clamping and releasing yoke apparatus comprising a support block having a cylindrical hole therein, a hollow cylindrical sleeve disposed aligned with and snugly in said hole and being slidable therein along the cylindrical axis of said sleeve and having a plurality of planar surfaces faced axially thereon and spaced circumferentially therearound, a workpiece clamping collet disposed snugly in said sleeve and being of the type for radial inward clamping movement and being affixed to said support block for preventing movement of said collet relative to said support block along said cylindrical axis, said sleeve and said collet having matching surfaces in sliding contact for effecting radially inwardly clamping movement of said collet onto a workpiece disposed in said collet and upon axial sliding of said sleeve in said hole, a yoke slidably mounted on said support block for movement parallel to said cylindrical axis and including a plurality of fingers having planar bearing surfaces in respective contact with the axially faced said sleeve planar surfaces, and said sleeve has grooves therein flanged by said axially faced surfaces and with said fingers and the base of said grooves being planar along the lengths of said fingers and in contact with each other for non-rotatably and snugly receiving said sleeve relative to said support block, and an actuator operatively connected to said yoke for displacing said bearing surfaces in the axial direction along said cylindrical axis for sliding said sleeve along said cylindrical axis to thereby actuate said collet for clamping a workpiece.

13. The collet clamping and releasing yoke apparatus as claimed in claim 12, wherein said yoke and said support block include mutually snugly matching sliding surfaces remote from said sleeve for closely guiding the sliding movement of said yoke on said support block.

14. The collet clamping and releasing yoke apparatus as claimed in claim 12, wherein said yoke includes a portion disposed in a location offset from said cylindrical axis, and said actuator includes a force-applicator disposed in said offset location and arranged to apply the clamping and releasing forces on said portion and parallel to said cylindrical axis.

15. The collet clamping and releasing yoke apparatus comprising a support block having a cylindrical hole therein, a hollow cylindrical sleeve disposed aligned with and snugly in said hole and being slidable therein along the cylindrical axis of said sleeve, a workpiece clamping collet disposed snugly in said sleeve and being of the type for radial inward clamping movement and being affixed to said support block for preventing movement of said collet relative to said support block along said cylindrical axis, said sleeve and said collet having matching surfaces in sliding contact for effecting radially inwardly clamping movement of said collet onto a workpiece disposed in said collet and upon axial sliding of said sleeve in said hole, a yoke slidably mounted on said support block for movement parallel to said cylindrical axis and including two spaced-apart and rigidly extending fingers disposed on and being respectively engaged with diametrically opposite sides of said sleeve, a restrainer extending between said sleeve and said collet for non-rotatably securing said sleeve and said collet together, and an actuator operatively connected to said yoke for displacing said fingers in the two axial directions along said cylindrical axis for sliding said sleeve along said cylindrical axis to thereby actuate said collet for alternate clamping and releasing of a workpiece.

16. The collet clamping and releasing yoke apparatus comprising a support block having a cylindrical hole therein, a hollow cylindrical sleeve disposed aligned with and snugly in said hole and being slidable therein along the cylindrical axis of said sleeve, a workpiece clamping collet disposed snugly in said sleeve and being of the type for radial inward clamping movement and being affixed to said support block for preventing movement of said collet relative to said support block along said cylindrical axis, said sleeve and said collet having matching surfaces in sliding contact for effecting radially inwardly clamping movement of said collet onto a workpiece disposed in said collet and upon axial sliding of said sleeve in said hole, a yoke slidably mounted on said support block for movement parallel to said cylindrical axis and including two spaced-apart and rigidly extending fingers disposed on and being respectively engaged with diametrically opposite sides of said sleeve, a fastener with a hollow interior for affixing said collet to said support block while allowing a workpiece to extend through said collet and said fastener, and an actuator operatively connected to said yoke for displacing said fingers in the two axial directions along said cylindrical axis for sliding said sleeve along said cylindrical axis to thereby actuate said collet for alternate clamping and releasing of a workpiece.

* * * * *